United States Patent
Cuduvalli Ravikanth Rao et al.

(10) Patent No.: US 10,277,703 B2
(45) Date of Patent: Apr. 30, 2019

(54) OPTIMIZING BANDWIDTH USAGE AND IMPROVING PERFORMANCE FOR WEB PAGE CACHING

(71) Applicant: International Business Machines Corporation, Armonk, NY (US)

(72) Inventors: Siddharth Cuduvalli Ravikanth Rao, Toronto (CA); Guru Prasad Shamanna, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 14/805,718

(22) Filed: Jul. 22, 2015

(65) Prior Publication Data
US 2017/0026449 A1 Jan. 26, 2017

(51) Int. Cl.
*H04L 29/08* (2006.01)
*H04L 29/06* (2006.01)
*G06Q 30/02* (2012.01)

(52) U.S. Cl.
CPC ......... *H04L 67/2842* (2013.01); *G06Q 30/02* (2013.01); *G06Q 30/0277* (2013.01); *H04L 67/02* (2013.01); *H04L 67/2823* (2013.01); *H04L 67/2852* (2013.01); *H04L 67/42* (2013.01)

(58) Field of Classification Search
CPC ..... H04L 67/2852; H04L 67/42; H04L 67/02; H04L 67/2842; H04L 67/2823; G06Q 30/0277; G06Q 30/02
See application file for complete search history.

(56) References Cited

U.S. PATENT DOCUMENTS

| | | |
|---|---|---|
| 6,192,382 B1 | 2/2001 | Lafer et al. |
| 6,591,278 B1 | 7/2003 | Ernst |
| 7,047,281 B1 | 5/2006 | Kausik |
| 7,177,900 B2 | 2/2007 | Ims et al. |
| 7,240,100 B1 | 7/2007 | Wein et al. |
| 7,360,025 B1 | 4/2008 | O'Connell et al. |
| 7,730,154 B2 | 6/2010 | Agarwalla et al. |
| 7,818,506 B1 | 10/2010 | Shepstone et al. |
| 7,908,437 B2 | 3/2011 | Challenger et al. |
| 8,082,299 B2 | 12/2011 | Chess et al. |
| 8,380,932 B1 | 2/2013 | Martin et al. |
| 8,875,012 B1 | 10/2014 | Puchta et al. |
| 8,924,510 B1 | 12/2014 | Preston et al. |
| 8,972,486 B2 | 3/2015 | Ishikawa |
| 9,332,035 B2 | 5/2016 | Ramaswamy et al. |
| 9,401,949 B1 * | 7/2016 | Kolam ................ H04L 67/1095 |
| 2002/0033844 A1 | 3/2002 | Levy et al. |
| 2004/0003132 A1 | 1/2004 | Stanley et al. |

(Continued)

OTHER PUBLICATIONS

R. Fielding et al., Request for Comments: 2616, Jun. 1999, Network Working Group: The Internet Society.*

(Continued)

*Primary Examiner* — Chris Parry
*Assistant Examiner* — Soe M Hlaing
(74) *Attorney, Agent, or Firm* — Stephanie L. Carusillo (57) ABSTRACT

Improving of bandwidth usage and performance for web page caching. Responsive to a subsequent request for a web page, a server only returns the set of web page portions of the requested web page that are not in a browser cache, have expired, and/or have changed.

15 Claims, 5 Drawing Sheets

(56) References Cited

U.S. PATENT DOCUMENTS

| | | |
|---|---|---|
| 2004/0220791 A1 | 11/2004 | Lamkin et al. |
| 2006/0064467 A1* | 3/2006 | Libby ............... G06F 17/30905 709/217 |
| 2006/0217990 A1 | 9/2006 | Theimer et al. |
| 2007/0101061 A1 | 5/2007 | Baskaran et al. |
| 2007/0156845 A1 | 7/2007 | Devanneaux et al. |
| 2008/0005086 A1 | 1/2008 | Moore |
| 2008/0005273 A1 | 1/2008 | Agarwalla et al. |
| 2008/0049971 A1 | 2/2008 | Ramos et al. |
| 2008/0104269 A1* | 5/2008 | Vitanov ............ G06F 17/30902 709/236 |
| 2008/0242221 A1 | 10/2008 | Shapiro et al. |
| 2008/0281852 A1 | 11/2008 | Sathish |
| 2009/0138484 A1 | 5/2009 | Ramos et al. |
| 2010/0161717 A1 | 6/2010 | Albrecht et al. |
| 2010/0179987 A1 | 7/2010 | Sebastian et al. |
| 2011/0060727 A1 | 3/2011 | Koul et al. |
| 2011/0179110 A1 | 7/2011 | Soloway |
| 2011/0238746 A1* | 9/2011 | Chess ............... G06F 17/30902 709/203 |
| 2011/0246555 A1 | 10/2011 | Hedges |
| 2013/0018873 A1 | 1/2013 | Velasco |
| 2013/0031459 A1 | 1/2013 | Khorashadi et al. |
| 2013/0086224 A1 | 4/2013 | Teraguchi |
| 2013/0086688 A1 | 4/2013 | Patel et al. |
| 2013/0097279 A1 | 4/2013 | Polis et al. |
| 2013/0124612 A1 | 5/2013 | Braginsky et al. |
| 2013/0124621 A1 | 5/2013 | Lepeska et al. |
| 2013/0159341 A1* | 6/2013 | Miyajima ......... G06F 17/30902 707/769 |
| 2013/0346476 A1* | 12/2013 | Jasperson ............ H04L 67/142 709/203 |
| 2014/0075338 A1 | 3/2014 | Lifshitz et al. |
| 2015/0222681 A1 | 8/2015 | Basile |
| 2016/0117739 A1 | 4/2016 | Patel et al. |
| 2016/0219123 A1 | 7/2016 | Slavicek et al. |
| 2016/0226976 A1 | 8/2016 | Ciabarra, Jr. et al. |
| 2016/0299985 A1 | 10/2016 | Poindessault |

OTHER PUBLICATIONS

Cuduvalli Ravikanth Rao, et al., "Optimizing Bandwidth Usage and Improving Performance for Web Page Caching", U.S. Appl. No. 15/402,409, filed Jan. 10, 2017, 39 pages.

Cuduvalli Ravikanth Rao, et al., "Optimizing Bandwidth Usage and Improving Performance for Web Page Caching", U.S. Appl. No. 15/405,486, filed Jan. 13, 2017, 39 pages.

IBM, Appendix P, List of IBM Patents or Patent Applications Treated as Related, dated Jan. 17, 2017, 2 pages.

Cuduvalli Ravikanth Rao, et al., "Optimizing Bandwidth Usage and Improving Performance for Web Page Caching", U.S. Appl. No. 15/014,302, filed Feb. 3, 2016.

Ravindran, "What is ASP.NET Caching? How to use Caching in ASP.NET?", DOTNET Spider, updated Jul. 22, 2012, 16 pages, <http://www.dotnetspider.com/resources/44055-What-ASPNET-Caching-How-use-Caching-ASPNET.aspx>.

"Caching with Rails: An overview", Ruby on Rails Guides, printed Mar. 20, 2015, 11 pages, <http://guides.rubyonrails.org/caching_with_rails.html#fragment-caching>.

"@ OutputCache", printed Mar. 20, 2015, 4 pages, <http://msdn.microsoft.com/en-in/library/hdxfb6cy(v=vs.85).aspx>.

* cited by examiner

OPTIMIZING BANDWIDTH USAGE AND IMPROVING PERFORMANCE FOR WEB PAGE CACHING

BACKGROUND

The present invention relates generally to the field of electrical computers and digital processing systems, and more particularly to multicomputer data transfer.

Web pages contain both static data and dynamic data. Static data generally remains constant for extended time periods and is usually consistent among different pages within a single domain. Dynamic data may change based on a variety of contextual factors, varies based on each web page request, and is different among web pages within in a single domain.

Web pages are not developed as a monolith. A web page is divided into smaller fragments which render specific information on the page. Each web page portion, the smallest fragment or sub-fragment that is not further subdivided, is either static or dynamic. When a web page is generated, the main page along with all the web page portions are executed. A server storing the web page and the web page portions has a caching policy for each web page portion. Upon a request, the server stitches the web page portions into a whole and transmits the web page.

SUMMARY

According to an aspect of the present invention, there is a method, computer program product, and/or system that performs the following steps (not necessarily in the following order): (i) receiving, from a requestor a request for a subsequent web page, the request including a first web page set of metadata; (ii) determining a set of current web page portions based, at least in part, on the first web page set of metadata; and (iii) sending the set of current web page portions to the requestor. The subsequent web page includes the set of current web page portions. At least the determining step is performed by computer software running on computer hardware.

DETAILED DESCRIPTION

Improving of bandwidth usage and performance for web page caching. Responsive to a subsequent request for a web page, a server only returns the set of web page portions of the requested web page that are not in a browser cache, have expired, and/or have changed. This Detailed Description section is divided into the following sub-sections: (i) The Hardware and Software Environment; (ii) Example Embodiment; (iii) Second Example Embodiment; (iv) Further Comments and/or Embodiments; and (v) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
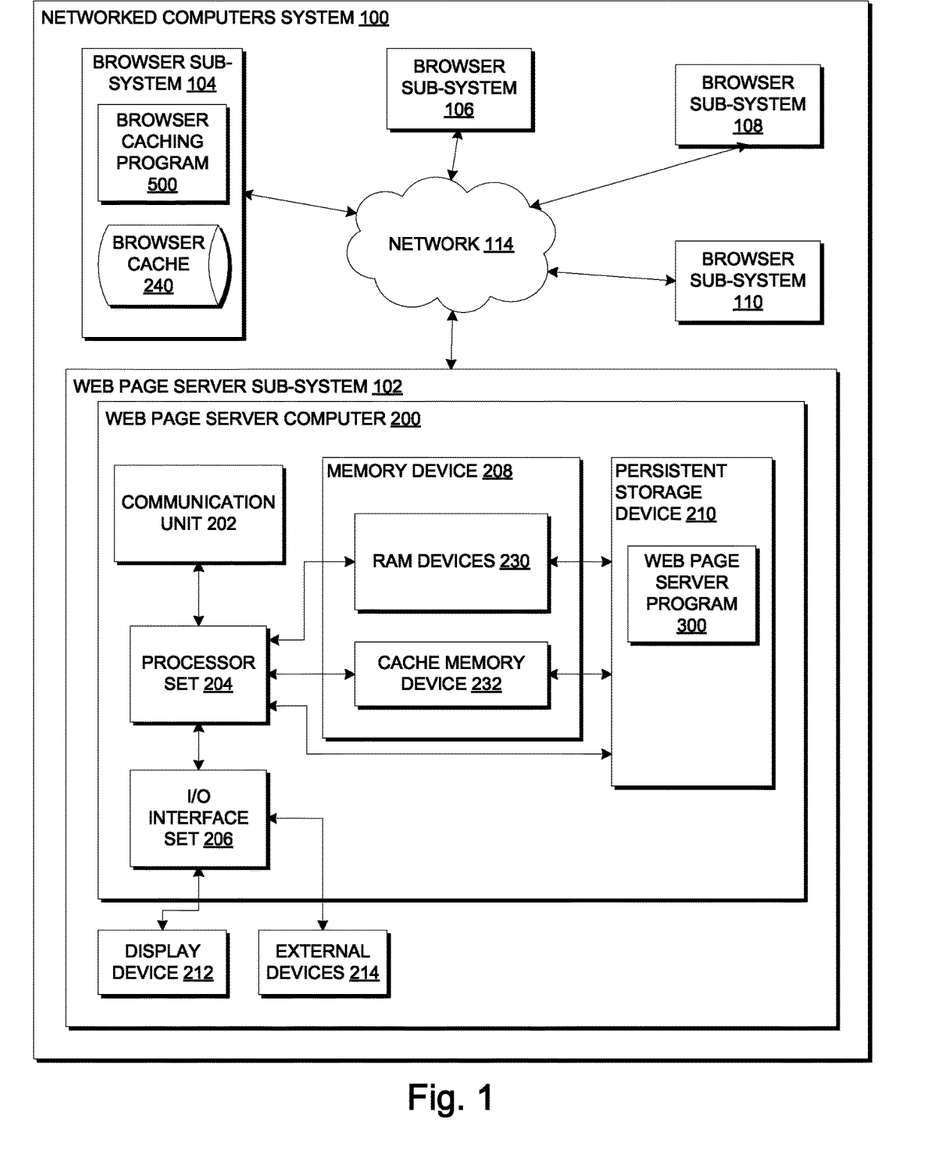
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: web page server sub-system 102; browser sub-systems 104, 106, 108, 110; communication network 114; web page server computer 200; communication unit 202; processor set 204; input/output (I/O) interface set 206; memory device 208; persistent storage device 210; display device 212; external devices 214; random access memory (RAM) devices 230; cache memory device 232; browser cache 240; web page server program 300; and browser caching program 500.

Web page server sub-system 102 is, in many respects, representative of the various computer sub-system(s) in the present invention. Accordingly, several portions of web page server sub-system 102 will now be discussed in the following paragraphs.

Web page server sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Web page server program 300 is a collection of machine readable instructions and/or data that is used to create, manage and control certain software functions that will be discussed in detail, below, in the Example Embodiment sub-section of this Detailed Description section.

Web page server sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Web page server sub-system 102 is shown as a block diagram with many double arrows. These double arrows (no separate reference numerals) represent a communications fabric, which provides communications between various components of web page server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for web page server sub-system 102; and/or (ii) devices external to web page server sub-system 102 may be able to provide memory for web page server sub-system 102.

Web page server program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Web page server program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communication unit 202, in these examples, provides for communications with other data processing systems or devices external to web page server sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with web page server computer 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, web page server program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
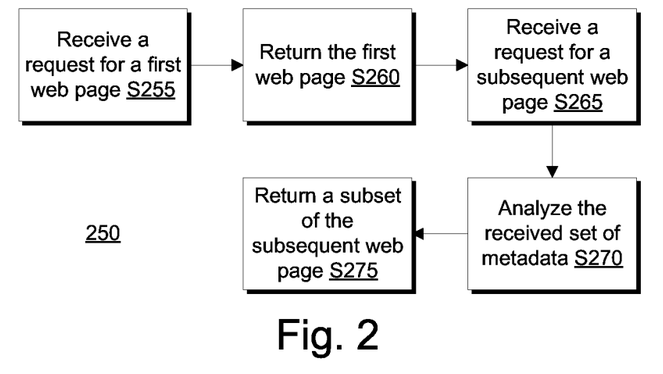
FIG. 2 is a flowchart showing a first embodiment method performed, at least in part, by the first embodiment system.
Figure 3:
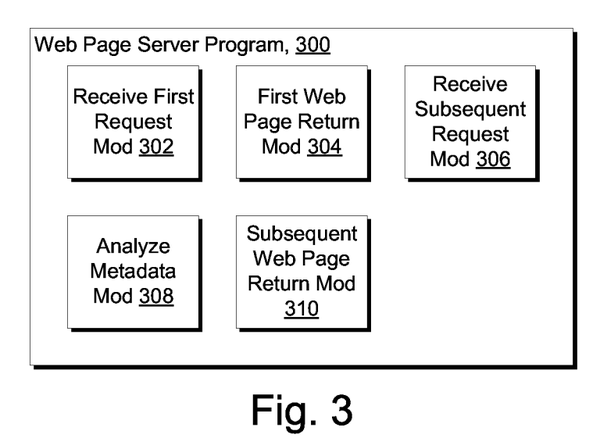
FIG. 3 is a block diagram view of a machine logic (for example, software) portion of the first embodiment system for performing at least some of the method steps in FIG. 2.
Figure 6:
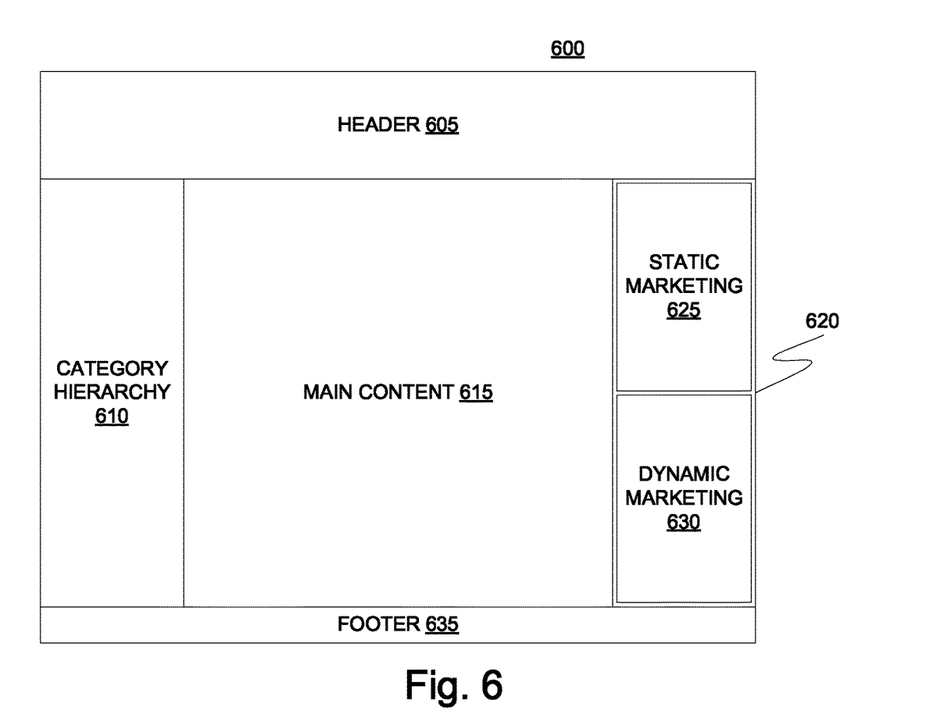
FIG. 6 is a diagram view depicting a web page according to an embodiment of the present invention that is helpful in understanding embodiments of the present invention.

FIG. 2 shows flowchart 250 depicting a method according to some embodiments of the present invention. FIG. 3 shows web page server program 300, which performs at least some of the method steps of flowchart 250. This method and associated software will now be discussed, over the course of the following paragraphs, with extensive reference to FIG. 2 (for the method step blocks) and FIG. 3 (for the software blocks). In this example web page server sub-system 102 receives requests for a first web page and a subsequent web page. Reference to FIG. 6 is helpful in understanding discussion of web page portions (fragments and sub-fragments) and caching.

Processing begins at step S255, where receive first request module ("mod") 302 receives a request for a first web page. In some embodiments of the present invention, the first web page is one web page of a set of web pages on a domain. In some embodiments of the present invention, the first web page is the only web page on a domain.

Processing proceeds to step S260, where first web page return mod 304 returns or provides the requestor the first web page. In this example, first web page return mod 304 also returns a first web page set of metadata with the first web page. In this example, the first web page set of metadata includes: (i) a set of fragment and/or sub-fragment (a set of web page portion) definitions; (ii) a set of request dates; (iii) a set of expiration dates; and (iv) a set of caching policies. In some embodiments of the present invention, the first web page consists of a set of web page portions. Alternatively, the first webpage set of metadata includes, but is not limited to: (i) a set of web page portion definitions; (ii) a set of request dates; (iii) a set of expiration dates; (iv) a set of caching policies; (v) a set of related web pages; (vi) a set of related advertisements; (vii) a site map; and/or (viii) a main content fragment.

In some embodiments of the present invention, the set of web page portion definitions includes definitions of a set of web page portions of the first web page. In some embodiments of the present invention, a caching policy for a web page portion is one of: (i) never cache (e.g., for dynamic advertising); (ii) cache inline with a main content fragment (e.g., a web page hierarchy); and (iii) cache individually (e.g., a web page footer). In some embodiments of the present invention, the set of request dates are individualized for each web page portion of the set of web page portions. In some embodiments of the present invention, the set of expiration dates are individualized for each web page portion of the set of web page portions. In some embodiments of the present invention, the set of related web pages includes all other web pages on the same domain as the first web page. In some embodiments of the present invention the set of related advertisements relate to the main content fragment of the first web page.

Processing proceeds to step S265, where receive subsequent request mod 306 receives a request for a subsequent web page. In this example, the request for the subsequent web page includes a set of metadata. In some embodiments of the present invention, receive subsequent request mod 306 does not receive any metadata. In this example, the subsequent web page is a later-in-time version of the first web page. In some embodiments of the present invention, the subsequent web page is a different web page on the same domain as the first web page. In some embodiments of the present invention, the set of metadata received is the first webpage set of metadata. In some embodiments of the present invention, the set of metadata received is a subset of the first webpage set of metadata. In some embodiments of the present invention, the subsequent request is a second request. Alternatively, the subsequent request is a third or later request.

Processing proceeds to step S270, where analyze metadata mod 308 analyzes the set of metadata received. In this example, the set of metadata received by receive subsequent request mod 306 corresponds to the subsequent web page. In some embodiments of the present invention, the set of metadata received by receive subsequent request mod 306 corresponds to a web page on the same domain as the subsequent web page. In some embodiments of the present invention, the subsequent web page is one of the set of related web pages in the metadata. In some embodiments of the present invention, analyze metadata mod 308 determines that a subset of the set of web page portions must be returned to the requestor because, after the set of request dates corresponding to that subset of the set of web page portions, the content presented in those web page portions changed. In some embodiments of the present invention, analyze metadata mod 308 determines that a subset of the set of web page portions must be returned to the requestor because, the set of expiration dates corresponding to that subset of the set of web page portions has passed.

In some embodiments of the present invention, analyze metadata mod 308 determines that the set of expiration dates corresponding to the subsequent web page have all passed, and, therefore, analyze metadata mod 308 treats the subsequent request as a first request and processing returns to step S255. In some embodiments of the present invention, analyze metadata mod 308 determines that the set of web page portion definitions in the set of metadata does not match the set of web page portion definitions corresponding to the subsequent web page, and, therefore, analyze metadata mod 308 treats treat the subsequent request as a first request, and processing returns to step S255. In some embodiments of the present invention, analyze metadata mod 308 determines that there is no set of metadata received, and processing returns to step S255.

In some embodiments of the present invention, analyze metadata mod 308 determines that a subset of the set of web page portions must be returned to the requestor because that subset of the set of web page portions was not properly cached pursuant to the set of caching policies. In some embodiments of the present invention, analyze metadata mod 308 determines that a subset of the set of web page portions must be returned to the requestor because that subset of the set of web page portions are never cached. In some embodiments of the present invention, analyze metadata mod 308 determines that a subset of the set of web page portions (the set of web page portions cached inline) must be returned to the requestor because, after the request date of the set of request dates corresponding to the main content fragment, the content presented in the main content fragment changed.

Processing terminates at step S275, where subsequent web page return mod 310 returns or provides the requestor a subset of the subsequent web page. In this example, subsequent web page return mod 310 also returns a subsequent web page set of metadata with the subset of the subsequent web page. In this example, the subsequent web page set of metadata includes: (i) a set of web page portion definitions; (ii) a set of request dates; (iii) a set of expiration dates; and (iv) a set of caching policies. In some embodiments of the present invention, the subsequent web page consists of a set of web page portions. In some embodiments of the present invention, subsequent web page return mod 310 returns only certain web page portions of the subsequent web page based on the analysis of the set of metadata by analyze metadata mod 308 in step S270. In some embodiments of the present invention, the subsequent webpage set of metadata includes, but is not limited to: (i) a set of web page portion definitions; (ii) a set of request dates; (iii) a set of expiration dates; (iv) a set of caching policies; (v) a set of related web pages; (vi) a set of related advertisements; (vii) a site map; and/or (viii) a main content fragment.

In some embodiments of the present invention, the set of web page portion definitions includes definitions of a set of web page portions of the subsequent web page. In some embodiments of the present invention, a caching policy for a web page portion of the set of web page portions is one of: (i) never cache (e.g., for dynamic advertising); (ii) cache inline with a main content fragment (e.g., a web page hierarchy); and (iii) cache individually (e.g., a web page footer). In some embodiments of the present invention, the set of request dates are individualized for each web page portion of the set of web page portions. In some embodiments of the present invention, the set of expiration dates are individualized for each web page portion of the set of web page portions. In some embodiments of the present invention, the set of related web pages includes all other web pages on the same domain as the subsequent web page. In some embodiments of the present invention the set of related advertisements relate to the main content fragment of the subsequent web page.

III. Second Example Embodiment

Figure 4:
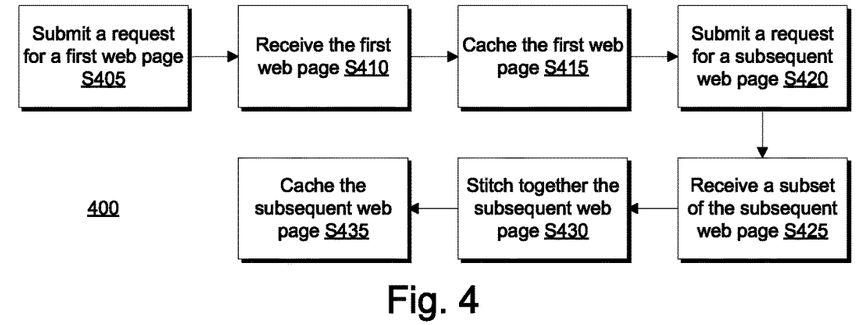
FIG. 4 is a flowchart showing a second embodiment method performed, at least in part, by the first embodiment system.
Figure 5:
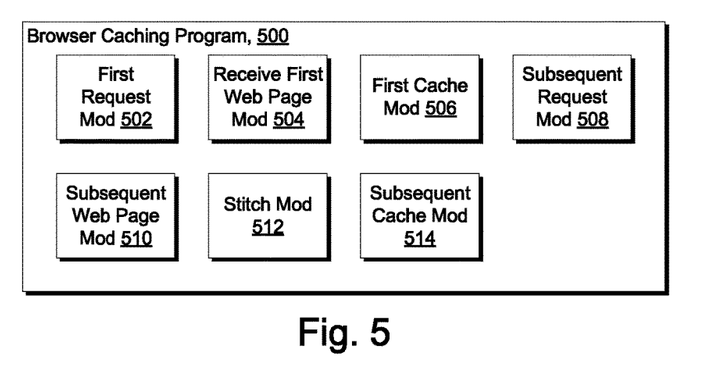
FIG. 5 is a block diagram view of a machine logic (for example, software) portion of the first embodiment system for performing at least some of the method steps in FIG. 4.

FIG. 4 shows flowchart 400 depicting a method according to some embodiments of the present invention. FIG. 5 shows browser caching program 500, which performs at least some of the method steps of flowchart 400. This method and associated software will now be discussed, over the course of the following paragraphs, with extensive reference to FIG. 4 (for the method step blocks) and FIG. 5 (for the software blocks). In this example browser sub-system 104 requests a first web page and a subsequent web page from web page server sub-system 102. Reference to FIG. 6 is helpful in understanding discussion of web page portions (fragments and sub-fragments) and caching.

Processing begins at step S405, where first request mod 502 submits a request for a first web page. In some embodiments of the present invention, the first web page is one web page of a set of web pages on a domain. In some embodiments of the present invention, the first web page is the only web page on a domain.

Processing proceeds to step S410, where receive first web page mod 504 receives the first web page. In this example, receive first web page mod 504 also receives a first web page set of metadata with the first web page. In this example, the first web page set of metadata includes: (i) a set of web page portion definitions; (ii) a set of request dates; (iii) a set of expiration dates; and (iv) a set of caching policies. In some embodiments of the present invention, the first web page consists of a set of web page portions. In some embodiments of the present invention, the first webpage set of metadata includes, but is not limited to: (i) a set of web page portion definitions; (ii) a set of request dates; (iii) a set of expiration dates; (iv) a set of caching policies; (v) a set of related web pages; (vi) a set of related advertisements; (vii) a site map; and/or (viii) a main content fragment.

In some embodiments of the present invention, the set of web page portion definitions includes definitions of a set of web page portions of the first web page. In some embodiments of the present invention, a caching policy for a web page portion of the set of web page portions is one of: (i) never cache (e.g., for dynamic advertising); (ii) cache inline with a main content fragment (e.g., a web page hierarchy); and (iii) cache individually (e.g., a web page footer). In some embodiments of the present invention, the set of request dates are individualized for each web page portion of the set of web page portions. In some embodiments of the present invention, the set of expiration dates are individualized for each web page portion of the set of web page portions. In some embodiments of the present invention, the set of related web pages includes all other web pages on the same domain as the first web page. In some embodiments of the present invention the set of related advertisements relate to the main content fragment of the first web page.

Processing proceeds to step S415, where first cache mod 506 caches the first web page. In this example, first cache mod 506 caches the first web page according to the set of caching policies in the first web page set of metadata. In some embodiments of the present invention, first cache mod 506 stores the first web page to browser cache 240 (FIG. 1). Alternatively, the first web page is cached in other locations within browser sub-system 104. In some embodiments of the present invention, first cache mod 506 caches the first web page as a single unit. Alternatively, first cache mod 506 caches each web page portion of the set of web page portions of the first web page as an independent unit. In some embodiments of the present invention, the first web page is cached such that browser sub-system 104 independently accesses each web page portion of the set of web page portions of the first web page.

Processing proceeds to step S420, where subsequent request mod 508 submits a request for a subsequent web page. In this example, the subsequent web page is the same web page as the first web page. In some embodiments of the present invention, the subsequent web page is a different web page on the same domain as the first web page. In some embodiments of the present invention, the subsequent request is a second request. Alternatively, the subsequent request is a third or later request. In some embodiments of the present invention, the subsequent web page is one web page of a set of web pages on a domain. In some embodiments of the present invention, the subsequent web page is the only web page on a domain. In this example, the request for the subsequent web page includes a set of metadata. In some embodiments of the present invention, the set of metadata is the first web page set of metadata. In some embodiments of the present invention, the set of metadata is a subset of the first web page set of metadata. In some embodiments of the present invention, the "first web page set of metadata" corresponds to a set of prior web pages.

Processing proceeds to step S425, where subsequent web page mod 510 receives a subset of the subsequent web page. In this example, subsequent web page mod 510 also receives a subsequent web page set of metadata with the subset of the subsequent web page. In this example, the subsequent web page set of metadata includes: (i) a set of web page portion definitions; (ii) a set of request dates; (iii) a set of expiration dates; and (iv) a set of caching policies. In some embodiments of the present invention, the subsequent web page consists of a set of web page portions. In some embodiments of the present invention, subsequent web page mod 510 receives only the subset of the subsequent web page, based on the metadata submitted in step S420. In some embodiments of the present invention, the subsequent webpage set of metadata includes, but is not limited to: (i) a set of web page portion definitions; (ii) a set of request dates; (iii) a set of expiration dates; (iv) a set of caching policies; (v) a set of related web pages; (vi) a set of related advertisements; (vii) a site map; and/or (viii) a main content fragment.

In some embodiments of the present invention, the set of web page portion definitions includes definitions of a set of web page portions of the subsequent web page. In some embodiments of the present invention, a caching policy for a web page portion of the set of web page portions is one of: (i) never cache (e.g., for dynamic advertising); (ii) cache inline with a main content fragment (e.g., a web page hierarchy); and (iii) cache individually (e.g., a web page footer). In some embodiments of the present invention, the set of request dates are individualized for each web page portion of the set of web page portions. In some embodiments of the present invention, the set of expiration dates are individualized for each web page portion of the set of web page portions. In some embodiments of the present invention, the set of related web pages includes all other web pages on the same domain as the subsequent web page. In some embodiments of the present invention the set of related advertisements relate to the main content fragment of the subsequent web page.

Processing proceeds to step S430, where stitch mod 512 stitches together, or combines, the subsequent web page. In this example, stitch mod 512 combines the subset of the subsequent web page received by subsequent web page mod 510 in step S425 with the subset of the first web page stored in the cache by first cache mod 506 in step S415. In some embodiments of the present invention, stitch mod 512 retrieves a subset of the set of web page portions from the first web page from memory. In some embodiments of the present invention, stitch mod 512 determines that a subset of the set of web page portions from the first web page are not used to stitch together the subsequent web page. In some embodiments of the present invention, the "first web page" includes a set of prior web pages.

Processing terminates at step S435, where subsequent cache mod 514 caches the subsequent web page. In this example, subsequent cache mod 514 caches the subsequent web page according to the set of caching policies in the subsequent web page set of metadata. In some embodiments of the present invention, subsequent cache mod 514 stores the subsequent web page to browser cache 240 (FIG. 1). Alternatively, the subsequent web page is cached in other locations within browser sub-system 104. In some embodiments of the present invention, subsequent cache mod 514 caches the subsequent web page as a single unit. Alternatively, subsequent cache mod 514 caches each web page portion of the set of web page portions of the subsequent web page as an independent unit. In some embodiments of the present invention, the subsequent web page is cached such that browser sub-system 104 independently accesses each web page portion of the set of web page portions of the subsequent web page. In some embodiments of the present invention, a subset of the set of web page portions of the subsequent web page are already stored to cache. In some embodiments of the present invention, subsequent cache mod 514 deletes a subset of the first web page from the cache, the subset of the first web page corresponding to the set of current web page portions.

IV. Further Comments and/or Embodiments

Some embodiments of the present invention recognize the following facts, potential problems, and/or potential areas for improvement with respect to the current state of the art: (i) a browser is unable to analyze a cache to identify a set of web page portions that is missing, changed, and/or expired; (ii) a browser is unable to request only a set of web page portions that is missing and/or expired; (iii) a server responds to a request from a browser for a web page by returning the entire web page to the browser; and/or (iv) a server requires a higher bandwidth to transmit a web page that is requested more frequently, even if the content of the web page does not change. Some embodiments of the present invention recognize that caching improves the response time and reduces the load on a server, though it does not optimize the network bandwidth usage. Some embodiments of the present invention recognize that the data exchanged between the server and the user remains the same despite caching.

FIG. 6 is a diagram view depicting web page 600 according to an embodiment of the present invention. Web page 600 includes: header 605; category hierarchy 610; main content 615; marketing 620; and footer 635. Each of these parts of web page 600 is a fragment. Marketing 620 includes: static marketing 625; and dynamic marketing 630. Each of these parts of marketing 620 is a sub-fragment.

In this example, web page 600 has a total size of 200 kB. Web page 600 is one of many web pages that make up a domain (e.g., www.domain.com) and each web page on the domain has a constituent set of web page portions (i.e., fragments and/or sub-fragments). Web page 600 includes main content 615. Main content 615 is independently cached, has a size of 60 kB, and has a thirty percent probability of changing between a first request and a subsequent request. Main content 615 will be stitched as part of the subsequent web page if a subsequent request is made for web page 600. If the subsequent request is made for a different web page on the domain, main content 615 will not be stitched as part of the subsequent web page.

Web page 600 also includes header 605 and static marketing 625 (a sub-fragment of marketing 620), which are cached inline with main content 615. Header 605 has a size of 70 kB and a ten percent probability of changing between a first request and a subsequent request. Static marketing 625 has a size of 15 kB and a five percent probability of changing between a first request and a subsequent request. Each web page on the domain has a different main content. The header and static marketing for each web page are dependent on the main content for that page. Header 605 and static marketing 625 will be reused for and stitched as part of the subsequent web page if a subsequent request is made for web page 600. If the subsequent request is made for a different web page on the domain, header 605 and static marketing 625 will not be stitched as part of the subsequent web page.

Web page 600 also includes category hierarchy 610 and footer 635, which are cached independently of main content 615. Category hierarchy 610 has a size of 20 kB and has a thirty percent probability of changing between a first request and a subsequent request. Footer 635 has a size of 20 kB and has a zero percent chance of changing between a first request and a subsequent request. In some embodiments of the present invention, category hierarchy 610 and footer 635 are cached inline with one another. Each web page on the domain reuses the same category hierarchy and footer. Therefore, these fragments will be will be reused for and stitched as part of the subsequent web page if the subsequent request is made for a different web page on the same domain.

Marketing 620 also includes dynamic marketing 630, which is never cached. Dynamic marketing 630 has a size of 15 kB and has a one-hundred percent chance of changing between a first request and a subsequent request. Dynamic marketing 630 may not bear any relation to main content 615. In some embodiments of the present invention, dynamic marketing 630 is provided to the domain by an advertiser or a sponsor. Dynamic marketing 630 will never be stitched as part of a subsequent web page.

Based on the size of web page 600 (and the constituent web page portions) and the probability of each web page portion changing between a first request and a subsequent request, the approximate bandwidth savings for a subsequent request of a web page are able to be estimated. In this example, the bandwidth savings occur when a web page portion does not change between a first request and a subsequent request. On average, main content 615 does not change between seventy percent of requests, resulting in a savings of 42 kB per request (0.7×60 kB per request). For the remaining web page portions of web page 600, the average savings are: (i) header 605, 63 kB (0.9×70 kB per request); (ii) static marketing 625, 14.25 kB (0.95×15 kb); (iii) category hierarchy 610, 14 kB (0.7×20 kB); (iv) footer 635, 20 kB (1.0×20 kB); and (v) dynamic marketing 630, 0 kB (0.0×15 kB). In total, the average savings for each request of web page 600 is 153.25 kB of 200 kB (or 76.625%).

Figure 7:
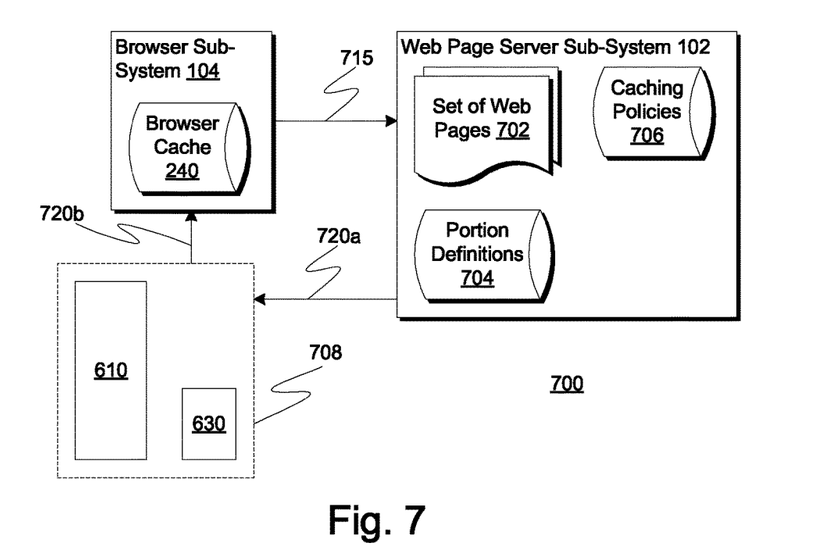
FIG. 7 is a block diagram of a second embodiment of a system according to the present invention.

FIG. 7 shows web page request environment 700 depicting a second embodiment of a system according to the present invention. In this example, browser sub-system 104 submits a request for a web page from web page server sub-system 102 and web page server sub-system 102 returns a subset of the web page to browser sub-system 104. Browser sub-system 104 includes browser cache 240. Web page server sub-system 102 includes: set of web pages 702; caching policies 706; and portion definitions 704.

Browser sub-system 104 submits a request for a web page to web page server sub-system 706 over data communication 715. Web page server sub-system 102 determines what web page portions must be returned to browser sub-system 104, based in part on information stored in caching policies 706 and portion definitions 704. Web page server sub-system 102 returns a subset of the web page to browser sub-system 104 over data communication 720a and data communication 720b. In this example, web page server sub-system 102 returns web page subset 708. Web page subset 708 includes: category hierarchy 610; dynamic marketing 630; and set of metadata (not separately shown). Based on the set of metadata, browser sub-system 104 determines what pieces of web page subset 708 to store to browser cache 240.

Figure 8:
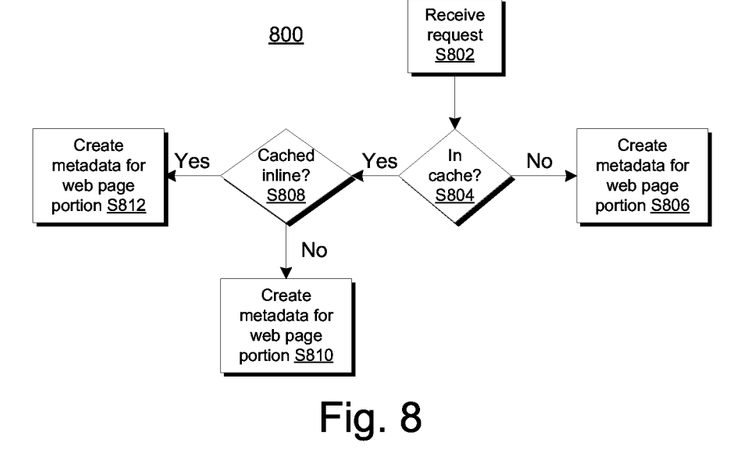
FIG. 8 is a flowchart showing a third embodiment method performed, at least in part by a third embodiment of a system according to the present invention.

FIG. 8 shows flowchart 800, depicting a method for creating a set of metadata associated with a web page portion according to some embodiments of the present invention. In this example, the web page server sub-system receives a second request for a web page. Flowchart 800 is executed for each web page portion (fragment or sub-fragment) on the web page. In this example, the web page server sub-system analyzes the request for a static marketing fragment.

Processing beings at step S802, where the web page server sub-system receives a request for a set of metadata associated with a web page portion. In this example, a browser transmitted a request to the web page server sub-system to invoke a web page. The web page server sub-system has determined that the web page includes a set of constituent web page portions and is processing the request for a single web page portion. In this example, the web page server sub-system is processing the request for the static marketing fragment of the web page.

Processing proceeds to determination step S804, where the web page server sub-system determines whether a web page portion is in a cache for the browser. In some embodiments of the present invention, the web page server sub-system analyzes the request from the browser to determine if the web page portion is in the cache. If the web page portion is not in the cache, processing proceeds through the "No" branch. If the web page portion is in the cache, processing proceeds through the "Yes" branch. In this example, the request included a set of metadata relating to contents of the cache. In this example, the static marketing fragment of the web page is stored in the cache and processing proceeds through the "Yes" branch.

Following the "No" branch from step S804, processing terminates at step S806, where the web page server sub-system creates a set of metadata. In some embodiments of the present invention, creating the set of metadata includes: (i) a web page portion definition; (ii) a caching policy; and/or (iii) a coded status tag. In some embodiments of the present invention, the coded status tag signifies a type of response the web page server sub-system is sending to the browser. In some embodiments of the present invention, the set of metadata is appended to a response from the web page server sub-system to the browser. In some embodiments of the present invention, processing returns to step S802 for a set of constituent sub-fragments making up the web page portion. In this example, processing does not proceed to step S806. However, when the web page server sub-system analyzes the dynamic marketing fragment for the web page, processing will proceed to step S806.

Following the "Yes" branch from step S804, processing proceeds to determination step S808, where the web page server sub-system determines whether the web page portion is cached inline. In some embodiments of the present invention, the web page server sub-system analyzes the request from the browser to determine if the web page portion is cached inline. If the web page portion is not cached inline, processing proceeds through the "No" branch. If the web page portion is cached inline, processing proceeds through the "Yes" branch. In this example, the request included a caching policy for the static marketing. In this example, the static marketing fragment is cached inline and processing proceeds through the "Yes" branch.

Following the "No" branch from step S808, processing terminates at step S810, where the web page server sub-system creates a set of metadata. In some embodiments of the present invention, creating the set of metadata includes: (i) a web page portion definition; (ii) a caching policy; and/or (iii) a coded status tag. In some embodiments of the present invention, the coded status tag signifies a type of response the web page server sub-system is sending to the browser. In some embodiments of the present invention, the set of metadata is appended to a response from the web page server sub-system to the browser. In some embodiments of the present invention, the web page portion contains a set of sub-fragments. In some embodiments of the present invention, processing returns to step S802 for a set of constituent sub-fragments making up the web page portion. In this example, processing does not proceed to step S810. However, when the web page server sub-system analyzes the footer fragment for the web page, processing will proceed to step S810.

Following the "Yes" branch from step S808, processing terminates at step S812, where the web page server sub-system creates a set of metadata. In some embodiments of the present invention, creating the set of metadata includes: (i) a web page portion definition; (ii) a caching policy; and/or (iii) a coded status tag. In some embodiments of the present invention, the coded status tag signifies a type of response the web page server sub-system is sending to the browser. In some embodiments of the present invention, the set of metadata is appended to a response from the web page server sub-system to the browser. In some embodiments of the present invention, the web page server sub-system creates a reference to the metadata for the main content fragment of the web page. In some embodiments of the present invention, processing returns to step S802 for a set of constituent sub-fragments making up the web page portion. In this example, processing of the static marketing fragment proceeds to step S812 and the set of metadata includes: (i) a location on the web page for the static marketing fragment; (ii) an inline caching policy; and (iii) a status tag stating indicating that the static marketing fragment was not replaced.

Figure 9:
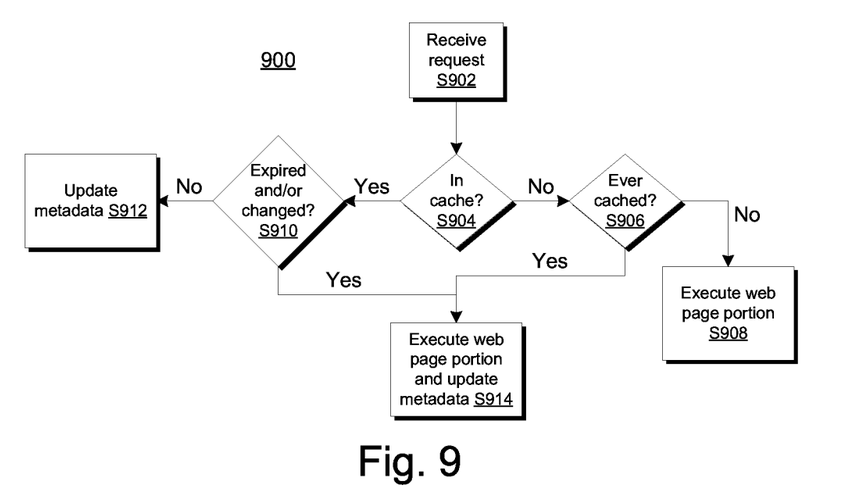
FIG. 9 is a flowchart showing a fourth embodiment method performed, at least in part by a fourth embodiment of a system according to the present invention.

FIG. 9 shows flowchart 900, depicting a method for responding to a request for a web page according to some embodiments of the present invention. In this example, the web page server sub-system receives a second request for a web page. Flowchart 900 is executed for each web page portion (fragment or sub-fragment) on the web page. In this example, the web page server sub-system analyzes the request for a main content fragment.

Processing begins at step S902, where the web page server sub-system receives a request for a web page portion. In this example, a browser transmitted a request to the web page server sub-system to invoke a web page. The web page server sub-system has determined that the web page includes a set of constituent web page portions and is processing the request for a single web page portion. In this example, the web page server sub-system is processing the request for the main content fragment of the web page.

Processing proceeds to determination step S904, where the web page server sub-system determines whether the web page portion is in a cache memory of the browser. In some embodiments of the present invention, the web page server sub-system analyzes a set of metadata from the browser to determine whether the web page portion is in the cache memory. If the web page portion is not in the cache memory, processing proceeds through the "No" branch. If the web page portion is in the cache memory, processing proceeds through the "Yes" branch. In this example, the web page server sub-system determines that main content fragment is in the cache memory and processing proceeds through the "Yes" branch. However, if the web page portion was overwritten in the cache memory or if the web page portion was improperly saved in the cache memory, processing proceeds through the "No" branch.

Following the "No" branch from step S904, processing proceeds to determination step S906, where the web page server sub-system determines whether the web page portion is ever cached. In some embodiments of the present invention, the web page server sub-system analyzes a set of caching policies to determine whether the web page portion is ever cached. If the web page portion is never cached, processing proceeds through the "No" branch. If the web page portion is ever cached, processing proceeds through the "Yes" branch. In this example, processing does not reach step S904. However, if the web page server sub-system is analyzing a dynamic marketing fragment, that fragment is never cached and processing proceeds through the "No" branch. Alternatively, if the web page server sub-system analyzes the caching policy and determines the web page portion is supposed to be cached, processing proceeds through the "Yes" branch.

Following the "No" branch from step S906, processing terminates at step S908, where the web page server sub-system executes the web page portion. In some embodiments of the present invention, the web page server sub-system appends the web page portion to a set of content to be returned to the browser. In some embodiments of the present invention, processing returns to step S902 for a set of constituent sub-fragments making up the web page portion. In this example, processing does not reach step S908. However, if the web page server is analyzing a dynamic marketing fragment, the web page server sub-system attaches the dynamic marketing fragment to a set of content to be returned to the browser.

Following the "Yes" branch from step S904, processing proceeds to determination step S910, where the web page server sub-system determines whether the web page portion has expired and/or changed. In some embodiments of the present invention, the web page server sub-system analyzes a set of metadata from the browser to determine whether the web page portion has changed in the time period since the browser last requested the web page portion. In some embodiments of the present invention, the web page server sub-system analyzes a set of metadata from the browser to determine whether the web page portion has expired in the time period since the browser last requested the web page portion. If the web page portion has not expired and has not changed, processing proceeds through the "No" branch. If the web page portion has expired and/or changed, processing proceeds through the "Yes" branch. In this example, the main content fragment has changed since the browser last requested the web page and processing proceeds through the "Yes" branch. However, if the web page server sub-system is analyzing the footer fragment, the footer fragment has not expired and has not changed, therefore processing would proceed through the "No" branch.

Following the "No" branch from step S910, processing terminates at step S912, where the web page server sub-system updates the set of metadata returned to the browser. In some embodiments of the present invention, the web page server sub-system appends the updated metadata to a set of content to be returned to the browser. In some embodiments of the present invention, the set of metadata pertaining to the web page portion is updated to reflect: the new request data and/or an update in the expiration date. In some embodiments of the present invention, the web page server sub-system does not return the web page portion to the browser. In some embodiments of the present invention, processing returns to step S902 for a set of constituent sub-fragments making up the web page portion. In this example, processing does not proceed to step S912. However, if the web page server sub-system is analyzing the footer fragment, the metadata for the footer fragment is updated to reflect the new request date and the web page server sub-system does not return the footer fragment to the browser.

Following the "Yes" branch from step S906, processing terminates at step S914, where the web page server sub-system executes the web page portion and updates the set of metadata returned to the browser. In some embodiments of the present invention, the web page server sub-system appends the web page portion to a set of content to be returned to the browser. In some embodiments of the present invention, the web page server sub-system appends the updated metadata to a set of content to be returned to the browser. In some embodiments of the present invention, the set of metadata pertaining to the web page portion is updated to reflect: the new request data and/or an update in the expiration date. In some embodiments of the present invention, processing returns to step S902 for a set of constituent sub-fragments making up the web page portion. In this example, the main content fragment has changed since the browser last requested the web page. The main content fragment is appended to the set of content being returned to the browser. Additionally, the metadata associated with the main content fragment is updated to reflect: the new definitions of the constituent web page portions that are included in the main content fragment; the request date; and the expiration date. The metadata associated with the main content fragment is appended to the set of content being returned to the browser.

Some embodiments of the present invention utilize a browser that implements a server side caching policy for a web page and caching headers to reduce bandwidth usage by the server. In some embodiments of the present invention, a server enables a browser to replicate a server side caching policy used by the server. In some embodiments of the present invention, the server reduces the amount of data transmitted to a browser. In some embodiments of the present invention, a browser is aware that a web page is constructed from a set of fragments. In some embodiments of the present invention, a browser is aware of a manner in which a set of fragments from a web page is cached by a server. In some embodiments of the present invention, a server only transmits data to a browser pertaining to a set of sub-fragments from a web page that have undergone a change.

Some embodiments of the present invention may include one, or more, of the following features, characteristics, and/or advantages: (i) a browser sends a server a set of metadata for a web page with a requesting for the web page; (ii) a server responds to a browser with an indication of whether a set of fragments from a web page can be reused; (iii) a server responds to a browser with a new set of fragments to replace a set of fragments that cannot be reused; (iv) a browser assembles a web page by stitching together a set of fragments from a cache and a set of fragments received from a server; (v) a browser requires only a single web page request to assemble the web page; (vi) a browser implements a server side caching policy to prevent unnecessary data from being exchanged between a server and the browser; and/or (vii) a browser is aware of a set of fragments present on a web page and a set of caching policies for the set of fragments.

Some embodiments of the present invention may include one, or more, of the following features, characteristics, and/or advantages: (i) a browser reuses cached fragments of a web page among multiple web pages within the same domain; (ii) a server optimizes and reduces bandwidth usage both when a web page is refreshed and when a second web page is requested within a domain; (iii) a browser detects different web page fragments, based on metadata from a server; (iv) a browser locally stores web page fragments with correlated metadata; (v) a browser renders a web page utilizing still-valid locally saved fragments; (vi) a server indicates which portions of a web page have changed; and/or (vii) a server only transmits fragments of a web page that are required by a browser.

Some embodiments of the present invention may include one, or more, of the following features, characteristics, and/or advantages: (i) a browser is aware of a server side caching policy; (ii) a server indicates to a browser with a set of metadata that a web page contains a set of fragments; (iii) a browser caches a set fragments from a web page with an set of metadata associates with the set of fragments; (iv) a browser sends a request for a web page to a server, the request includes a set of metadata for a set of fragments that make up the web page; (v) a server indicates to a browser whether a set of fragments from a web page are still valid; (vi) a server transmits a set of fragments from a web page to a browser for the set of fragments that have changed; and/or (vii) a server transmits a set of metadata for a web page, the set of metadata contains definitions for a set of fragments from the web page and a caching policy for the set of fragments.

Some embodiments of the present invention may include one, or more, of the following features, characteristics, and/or advantages: (i) optimizes network bandwidth usage and reduces response time for loading a web page; (ii) utilizes a server side caching policy for a web page and caches headers to reduce bandwidth usage; (iii) saves bandwidth based on the probability of a set of fragments from a web page undergoing a change, a size of the set of fragments, and a rate of viewing of the web page; (iv) generates web pages dynamically by analyzing parameters for a request for a web page and contextual information; (v) caches a web page to prevent dynamic generation of the web page for each request; (vi) optimizes network bandwidth usage and reduces response time to load a web page; and/or (vii) implements a server side cache policy on a browser.

Some embodiments of the present invention may include one, or more, of the following features, characteristics, and/or advantages: (i) a server responds to a refresh request from a browser with a set of metadata correlating to a set of fragments from the web page; (ii) a browser caches a set of fragments and/or sub-fragments from a web page based on a set of metadata giving an individual caching policy for each fragment and/or sub-fragment; (iii) a browser caches a web page based on a set of metadata received from a server; (iv) a browser updates a set of cache information for a web page based on a set of metadata received from a server; (v) a browser transmits a set of metadata to a server relating to a web page, including a date the web page was last refreshed; and/or (vi) a server transmits a set of metadata to a browser relating to a web page, including a date the web page will expire.

Some embodiments of the present invention may include one, or more, of the following features, characteristics, and/or advantages: (i) a server recursively determines whether to transmit a set of fragments from a web page to a browser based on a set of metadata received from the browser; (ii) a server recursively determines whether to transmit a set of fragments from a web page to a browser based on a set of caching policies (e.g., cached inline, cached separately, never cached); and/or (iii) a server transmits a set of metadata to a browser including information that a set of fragments in a cache should be reused.

V. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including, but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; an electrical connection may include, but need not be limited to, elements such as capacitors, inductors, transformers, vacuum tubes, and the like.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches, and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication, and communication routes that have wireless and wired portions; data communication is not necessarily limited to: (i) direct data communication; (ii) indirect data communication; and/or (iii) data communication where the format, packetization status, medium, encryption status, and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions, and/or things interposed between their objects and subjects.

Without substantial human intervention: a process that occurs automatically (often by operation of machine logic, such as software) with little or no human input; some examples that involve "no substantial human intervention"

include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes—no style confirmation required to be made by a human); and (iii) using machine logic, a computer has made a weighty decision (for example, a decision to ground all airplanes in anticipation of bad weather), but, before implementing the weighty decision the computer must obtain simple yes—no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    receiving, by a server from a browser, a first request for a first web page, wherein the first webpage comprises a first set of portions;
    sending, by a server to a browser, the first web page and a first set of web page metadata, wherein the first set of web page metadata comprises a first set of web page portion definitions, a first set of request dates, a first set of expiration dates, and a first set of caching policies;
    receiving, by the server from the browser, a second request for a second web page, wherein the second request comprises a second set of web page metadata, and wherein the second set of web page metadata comprises a second set of web page portion definitions, a second set of request dates, a second set of expiration dates, and a second set of caching policies;
    correlating, by the server, the first set of web page metadata to the second set of web page metadata;
    determining, by the server, that a first subset of portions of the first web page has changed, based on the second set of web page portion definitions;
    determining, by the server, that a second subset of portions of the first web page has not been cached, based on the second set of caching policies;
    determining, by the server, that a third subset of portions of the first web page has expired, based on the second set of expiration dates;
    creating, by the server, a third set of web page metadata; and
    returning, by the server to the browser, the third set of web page metadata and the second subset of portions of the first web page that has not been cached, wherein the third set of web page metadata comprises a third set of web page portion definitions, a third set of request dates, a third set of expiration dates, and a third set of caching policies.

2. The method of claim 1, wherein the first web page and the second web page are web pages on a domain.

3. The method of claim 2, wherein the second web page is the first web page.

4. The method of claim 1, further comprising:
    caching the first web page to a cache; and
    stitching the second web page, wherein the second web page includes the first subset of the first web page portions that has changed.

5. The method of claim 4, wherein stitching the second web page comprises:
    retrieving the first subset of the first web page from the cache; and
    combining a set of web page portions associated with the second web page with the first subset of the first web page corresponding to a set of web page portions of the second web page not received in the receiving step.

6. The method of claim 1, wherein creating the third set of web page metadata comprises:
    determining, by the server, whether a first portion of the first web page is in a cache for the browser;
    responsive to determining that the first portion of the first web page is not in the cache for the browser, creating, by the server, a set of metadata for the first portion, wherein the set of metadata for the first portion comprises a web page portion definition, a caching policy, and a status tag;
    responsive to determining that the first portion of the first web page is in the cache for the browser, determining, by the server, whether the first portion of the first web page is cached inline;
    responsive to determining that the first portion of the first web page is not cached inline, creating, by the server, a set of metadata for the first portion, wherein the set of metadata for the first portion comprises a web page portion definition, a caching policy, and a status tag; and
    responsive to determining that the first portion of the first web page is cached inline, creating, by the server, a set of metadata for the first portion, wherein the set of metadata for the first portion comprises a web page portion definition, an inline caching policy, and a status tag.

7. The method of claim 1, wherein creating the third set of web page metadata comprises:
    subsequent to receiving the second request, determining, by the server, whether a first portion of the second web page is in a cache of the browser;
    responsive to determining that the first portion of the second web page is not in the cache, determining, by the server, whether the first portion of the second web page is ever cached;
    responsive to determining that the first portion of the second web page is never cached, appending, by the server, the first portion of the second web page to a set of content to be returned to the browser;
    responsive to determining that the first portion of the second web page is in the cache, determining, by the server, whether the first portion of the second web page has expired or changed; and
    responsive to determining that the first portion of the second web page has not expired or changed, updating, by the server, the third set of web page metadata to reflect an updated request date and updated expiration date.

8. A computer system comprising:
one or more computer processors;
one or more computer readable storage media; and
program instructions stored on the one or more computer readable storage media for execution by at least one of the one or more computer processors, the program instructions comprising:
  program instructions to receive, by a server from a browser, a first request for a first web page, wherein the first webpage comprises a first set of portions;
  program instructions to send, by a server to a browser, the first web page and a first set of web page metadata, wherein the first set of web page metadata comprises a first set of web page portion definitions, a first set of request dates, a first set of expiration dates, and a first set of caching policies;
  program instructions to receive, by the server from the browser, a second request for a second web page, wherein the second request comprises a second set of web page metadata, and wherein the second set of web page metadata comprises a second set of web page portion definitions, a second set of request dates, a second set of expiration dates, and a second set of caching policies;
  program instructions to correlate, by the server, the first set of web page metadata to the second set of web page metadata;
  program instructions to determine that a first subset of portions of the first web page has changed, based on the second set of web page portion definitions;
  program instructions to determine that a second subset of portions of the first web page has not been cached, based on the second set of caching policies;
  program instructions to determine that a third subset of portions of the first web page has expired, based on the second set of expiration dates;
  program instructions to create a third set of web page metadata; and
  program instructions to return, by the server to the browser, the third set of web page metadata and the second subset of portions of the first web page that has not been cached, wherein the third set of web page metadata comprises a third set of web page portion definitions, a third set of request dates, a third set of expiration dates, and a third set of caching policies.

9. The computer system of claim 8, wherein the first web page and the second web pages on a domain.

10. The computer system of claim 9, wherein the second web page is the first web page.

11. The computer system of claim 8, further comprising:
  program instructions to cache the first web page to a cache; and
  program instructions to stitch the second web page, wherein the second web page includes the first subset of the first web page portions that has changed.

12. The computer system of claim 11, wherein the program instructions to stitch the second web page comprise:
  retrieving the first subset of the first web page from the cache; and
  combining a set of web page portions associated with the second web page with the first subset of the first web page corresponding to a set of web page portions of the second web page not received in the receiving step.

13. The computer system of claim 8, wherein the program instructions to create the third set of web page metadata comprise:
  program instructions to determine, by the server, whether a first portion of the first web page is in a cache for the browser;
  responsive to determining that the first portion of the first web page is not in the cache for the browser, program instructions to create, by the server, a set of metadata for the first portion, wherein the set of metadata for the first portion comprises a web page portion definition, a caching policy, and a status tag;
  responsive to determining that the first portion of the first web page is in the cache for the browser, program instructions to determine, by the server, whether the first portion of the first web page is cached inline;
  responsive to determining that the first portion of the first web page is not cached inline, program instructions to create, by the server, a set of metadata for the first portion, wherein the set of metadata for the first portion comprises a web page portion definition, a caching policy, and a status tag; and
  responsive to determining that the first portion of the first web page is cached inline, program instructions to create, by the server, a set of metadata for the first portion, wherein the set of metadata for the first portion comprises a web page portion definition, an inline caching policy, and a status tag.

14. The computer system of claim 8, wherein the program instructions to create the third set of web page metadata comprise:
  subsequent to receiving the second request, program instructions to determine, by the server, whether a first portion of the second web page is in a cache of the browser,
  responsive to determining that the first portion of the second web page is not in the cache, program instructions to determine, by the server, whether the first portion of the second web page is ever cached;
  responsive to determining that the first portion of the second web page is never cached, program instructions to append, by the server, the first portion of the second web page to a set of content to be returned to the browser;
  responsive to determining that the first portion of the second web page is in the cache, program instructions to determine, by the server, whether the first portion of the second web page has expired or changed; and
  responsive to determining that the first portion of the second web page has not expired or changed, program instructions to update, by the server, the third set of web page metadata to reflect an updated request date and updated expiration date.

15. A computer program product comprising:
one or more computer readable storage media; and
program instructions stored on the one or more computer readable storage media, the program instructions comprising:
  program instructions to receive, by a server from a browser, a first request for a first web page, wherein the first webpage comprises a first set of portions;
  program instructions to send, by a server to a browser, the first web page and a first set of web page metadata, wherein the first set of web page metadata comprises a first set of web page portion definitions, a first set of request dates, a first set of expiration dates, and a first set of caching policies;

program instructions to receive, by the server from the browser, a second request for a second web page, wherein the second request comprises a second set of web page metadata, and wherein the second set of web page metadata comprises a second set of web page portion definitions, a second set of request dates, a second set of expiration dates, and a second set of caching policies;

program instructions to correlate, by the server, the first set of web page metadata to the second set of web page metadata;

program instructions to determine that a first subset of portions of the first web page has changed, based on the second set of web page portion definitions;

program instructions to determine that a second subset of portions of the first web page has not been cached, based on the second set of caching policies;

program instructions to determine that a third subset of portions of the first web page has expired, based on the second set of expiration dates;

program instructions to create a third set of web page metadata; and program instructions to return, by the server to the browser, the third set of web page metadata and the second subset of portions of the first web page that has not been cached, wherein the third set of web page metadata comprises a third set of web page portion definitions, a third set of request dates, a third set of expiration dates, and a third set of caching policies.

* * * * *